(12) United States Patent
Englekirk

(10) Patent No.: US 12,517,852 B2
(45) Date of Patent: Jan. 6, 2026

(54) PIN DETERMINATION FOR SINGLE-CONDUCTOR INTERFACE SYSTEMS AND METHODS

(71) Applicant: Murata Manufacturing Co., Ltd., Nagaokakyo (JP)

(72) Inventor: Robert Mark Englekirk, Littleton, CO (US)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 18/799,884

(22) Filed: Aug. 9, 2024

(65) Prior Publication Data
US 2024/0403250 A1 Dec. 5, 2024

Related U.S. Application Data

(63) Continuation-in-part of application No. 17/667,027, filed on Feb. 8, 2022, now Pat. No. 12,237,835.

(51) Int. Cl.
*G06F 13/40* (2006.01)
*G06F 11/30* (2006.01)

(52) U.S. Cl.
CPC .......... *G06F 13/40* (2013.01); *G06F 11/3027* (2013.01); *G06F 11/3062* (2013.01); *G06F 2212/1028* (2013.01)

(58) Field of Classification Search
CPC .. G06F 11/3072; G06F 11/3062; G06F 13/40; G06F 2212/1028; H03K 19/018592; H03K 5/2472
See application file for complete search history.

(56) References Cited

U.S. PATENT DOCUMENTS

| | | | |
|---|---|---|---|
| 7,880,447 B1 * | 2/2011 | Lin | H02M 3/33515 323/283 |
| 11,163,347 B2 | 11/2021 | Saes | |
| 11,894,840 B2 | 2/2024 | Englekirk et al. | |
| 2015/0074306 A1 | 3/2015 | Ayyagari et al. | |

(Continued)

FOREIGN PATENT DOCUMENTS

| KR | 2017 0024223 A | 3/2017 |
|---|---|---|
| KR | 2021 0099325 A | 8/2021 |

OTHER PUBLICATIONS

Analog Devices, "DS2488 1-Wire Dual-Port Link" (Year: 2022).*

(Continued)

*Primary Examiner* — Phong H Dang
(74) *Attorney, Agent, or Firm* — Haynes and Boone, LLP

(57) ABSTRACT

Circuits and methods for defining functionality of swappable pins are provided. A power-on-reset (POR) circuit detects that a supply voltage is above a POR threshold during start-up or a reset operation. Transmission gate circuits monitor inputs from a first pin and the second pin and deactivate once the POR circuit detects that the supply voltage is above the POR threshold. A latch circuit receives outputs of the transmission gate circuits as inputs. Once the supply voltage is above the POR threshold, the latch circuit generates a first output corresponding to the first pin, and a second output corresponding to the second pin, where the first pin is defined as a I/O pin and the second pin is defined as a capacitance pin or vice versa based on the first output and the second output.

20 Claims, 9 Drawing Sheets

(56) References Cited

U.S. PATENT DOCUMENTS

| | | | |
|---|---|---|---|
| 2016/0007417 A1* | 1/2016 | Gao | H05B 45/10 |
| | | | 363/21.16 |
| 2016/0054777 A1 | 2/2016 | Dwelley et al. | |
| 2017/0039402 A1 | 2/2017 | Iannotti et al. | |
| 2020/0219522 A1 | 7/2020 | Lesso et al. | |
| 2021/0218595 A1* | 7/2021 | Liu | G06F 13/4059 |
| 2022/0390998 A1 | 12/2022 | Wee et al. | |
| 2023/0253960 A1 | 8/2023 | Englekirk | |
| 2024/0402241 A1* | 12/2024 | Petenyi | G01R 27/08 |

OTHER PUBLICATIONS

Maxim Integrated, "1-Wire Extended Network Standard", Application Note 3925, Oct. 26, 2006, 5 pgs. [downloaded at https://www.analog.com/media/en/technical-documentation/design-notes/1wireregextended-network-standard.pdf].

Maxim Integrated, "Overview of 1-Wire Technology and its Use", Tutorial 1796, Jun. 19, 2008, 13 pgs. [downloaded at https://www.analog.com/en/resources/technical-articles/guide-to-1wire-communication.html].

Wikipedia, "1-Wire", Wikepedia, The Free Encyclopedia, Jul. 12, 2024, 5 pgs. [downloaded at https://en.wikipedia.org/wiki/1-Wire].

* cited by examiner

PIN DETERMINATION FOR SINGLE-CONDUCTOR INTERFACE SYSTEMS AND METHODS

CROSS-REFERENCE TO RELATED APPLICATIONS

This patent application is a continuation-in-part of U.S. patent application Ser. No. 17/667,027 filed Feb. 8, 2022, and entitled "PIN DETERMINATION FOR SINGLE-CONDUCTOR INTERFACE" which is incorporated herein by reference in its entirety.

BACKGROUND

(1) Technical Field

This invention relates to electronic circuits, and more particularly to electronic circuits interconnected by a serial communications bus.

(2) Background

1-Wire® is a known device communications bus architecture and protocol that provides data, signaling, and power over a single conductor (despite the "1-Wire" name, all devices must also have a ground connection to permit a return current to flow through the data wire). 1-Wire is a voltage-based digital system that provides half-duplex bidirectional communication. With only two contacts, 1-Wire devices are a very economical way to add electronic functionality to non-electronic objects for identification, authentication, and delivery of calibration data, manufacturing information, sensor output data, and other information.

FIG. 1A is a block diagram of an example 1-Wire system 100. A 1-Wire controller 102 initiates and controls communication with one or more 1-Wire peripherals 104 on a 1-Wire bus. A typical controller 102 includes a Port Control circuit 106 that receives data (RXD) through a buffer 108 and transmits commands and data (TXD) through an open-drain transistor M0, preferably an N-type MOSFET (NFET). It this example, the drain of the NFET is connected to ground when a high voltage (logic 1) is applied to the gate of the NFET device M0. When a low voltage (logic 0) is applied to the gate of the NFET, the drain of the NFET presents a high impedance, and a pull-up resistor R (e.g., 4.7 kΩ) connected to a positive voltage supply $V_{DD}$ (e.g., 3V) provides a voltage near $V_{DD}$ on the 1-Wire bus.

FIG. 1B is a block diagram showing a 1-Wire peripheral 104 in greater detail. In many applications, the voltage source may be a "parasitic" type comprising a diode D0 coupled to the 1-Wire bus. The diode D0 supplies voltage from the 1-Wire bus to a storage capacitor C coupled between circuit ground and an internal power bus $V_{DD\_INT}$. The diode/capacitor parasitic power supply allows a peripheral 104 to operate for some amount of time even when the 1-Wire bus is pulled to ground. In the illustrated example, the storage capacitor C is external to the peripheral 104, coupled to a CAP terminal or "pin" (in some ultra-low power applications, the storage capacitor C may be internal to the peripheral 104). In any case, when command transmission begins on the 1-Wire bus, storage capacitor C charging is halted, and commands are interpreted in known manner. When a command sequence is over, the storage capacitor C resumes charging.

In some applications, a $V_{DD}$ pin may be coupled to a non-parasitic external voltage source to provide power to internal components to an internal power bus $V_{DD\_INT}$; in the illustrated example, the connection of the $V_{DD}$ pin to the internal power bus $V_{DD\_INT}$ is through a diode DI.

A typical peripheral 104 includes an Interface Control circuit 120 that receives data (RXD) from the 1-Wire bus through an input/output (I/O) pin coupled to a buffer 122 (which may include a Schmitt trigger) and transmits commands and data (TXD) to the 1-Wire bus through an open-drain transistor M1 (e.g., an NFET) coupled to the I/O pin. The Interface Control circuit 120 passes data and commands to a Device Function 124 that includes a unique identification (ID) number. The Device Function 124 may perform a variety of functions, such as sensing humidity and/or temperature, storing local data representing monetary amounts (e.g., for use with transit services or vending machines), and/or serving as a personal or item identifier. A ground pin GND provides a reference potential (circuit ground) and return path to the controller 102.

Communication commences when a controller 102 or peripheral 104 briefly pulls the 1-Wire bus low (e.g., connects the pull-up resistor R to ground through its respective output NFET Mx) according to a defined protocol. The 1-Wire bus is high when idle, and thus can also power a limited number of peripherals 104. The 1-Wire bus is considered idle when no device (controller or remote) is pulling the 1-Wire bus to ground, and therefore, the 1-Wire bus will be at a logic 1 state, at or near $V_{DD}$. When any device pulls the 1-Wire bus to ground, the 1-Wire will be in a logic 0 state. During idle time, all peripherals 104 will see $V_{DD\_INT}$ and accordingly the storage capacitor C of any associated parasitic power supply will charge.

SUMMARY

Usage of the 1-Wire communications bus architecture has increased since its introduction, which has spurred demand for greater flexibility in using the technology. The present invention addresses that demand by encompassing circuits and methods for determining the characteristics of swappable pins in a peripheral in a 1-Wire or similar single-conductor system, thereby allowing each one of two pins to be either an I/O pin (connected to an I/O line like the 1-Wire bus) or a CAP pin (connected to a line coupled to a storage capacitor C).

Allowing the I/O and CAP pins to be swappable provides for greater flexibility in laying out printed circuit boards (PCBs) and circuit modules. For example, it is sometimes beneficial in laying out PCBs and circuit modules to use "left-handed" and "right-handed" versions of the same part in order to reduce area and/or coupling. However, it is undesirable to have two versions of a part just to satisfy that criterion. A single integrated circuit chip having suitably-positioned swappable pins may be used as either a left-handed or a right-handed component.

Another advantage of having swappable I/O and CAP pins is that detection of each possible configuration allows use of two different device IDs for a 1-Wire system peripheral, thereby enabling the possibility of different behavior as a function of pin connections. Changing the ID of a part allows two otherwise identical parts to be differentiated in serial communications.

Embodiments of the present invention perform the following functions: detecting the initial phase of device startup; determining which of pins A and B is coupled to an I/O line like the 1-Wire bus (and thus is the I/O pin), and which of pins A and B is coupled to the storage capacitor C (and thus is the CAP pin); and generating a flag signal indicating that determination, which may be used by other circuitry within the peripheral. Detection of pin characteristics is determined at device startup by latching a logic signal to represent the fastest rising signal on the lines (I/O and CAP) coupled to pins A and B, flagging that latched signal line as being the I/O line, and preventing further changes to the latch output until the next startup cycle.

Embodiments of the invention include a circuit, comprising: a first transmission gate circuit configured to monitor a signal from a first pin; a second transmission gate circuit configured to monitor a signal from a second pin, wherein the first pin and the second pin are defined to perform a first function or a second function; a power-on-reset (POR) circuit configured to monitor a supply voltage; a latch circuit configured to: receive outputs of the first transmission gate circuit and the second transmission gate circuit as inputs; and generate a first output corresponding to the first pin and a second output corresponding to the second pin once the POR circuit detects that the supply voltage is above a POR threshold, wherein the first output is an inverse of the second output; a first inverter circuit configured to receive the first output of the latch circuit and define a function of the first pin based on the first output; and a second inverter circuit configured to receive the second output of the latch circuit and define the second function of the second pin based on the second output.

Embodiments of the invention include a method comprising: tracking, using transmission gate circuits and a latch circuit, inputs from a first pin and a second pin, where the first pin and the second pin are swappable pins; turning the transmission gate circuits off and activating the latch circuit once a power supply reaches a power-on-reset (POR) threshold; determining, using the latch circuit and one the POR threshold is reached, a first output associated with the first pin and a second output associated with the second pin from the inputs; and defining, using the first output and the second output, a first functionality of the first pin, and a second functionality of the second pin.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements if the context requires.

DETAILED DESCRIPTION

Usage of the 1-Wire communications bus architecture has increased since its introduction, which has spurred demand for greater flexibility in using the technology. The present invention addresses that demand by encompassing circuits and methods for determining the characteristics of swappable pins in a peripheral in a 1-Wire or similar single-conductor system, thereby allowing each one of two pins to be either a power or I/O pin (connected to an I/O line like the 1-Wire bus) or a CAP pin (connected to a line coupled to an external storage capacitor C).

Allowing the I/O and CAP pins to be swappable provides for greater flexibility in laying out printed circuit boards (PCBs) and circuit modules. For example, it is sometimes beneficial in laying out PCBs and circuit modules to use "left-handed" and "right-handed" versions of the same part in order to reduce area and/or coupling. However, it is undesirable to have two versions of a part just to satisfy that criterion. A single integrated circuit chip having suitably-positioned swappable pins could be used as either a left-handed or a right-handed component.

Another advantage of having swappable I/O and CAP pins is that detection of each possible configuration allows use of two different device IDs for a 1-Wire system peripheral, thereby enabling the possibility of different behavior as a function of pin connections. Changing the ID of a part allows two otherwise identical parts to be differentiated in serial communications.

In some instances, the embodiments are also directed to identifying a pin that is I/O pin and a CAP pin at the initial phase of the start-up or reset. The start-up or reset may occur when a voltage supply is turned off and then back on. Once the voltage supply is back on, the circuits and method discussed herein may determine which pin of the two pins is defined as a CAP pin and the I/O pin. In some instances, the pin that powers up first may be defined as the I/O pin. The swappable pins may be included on a chip that may be included in a portable communications device, such as a smartphone.

Figure 1A:
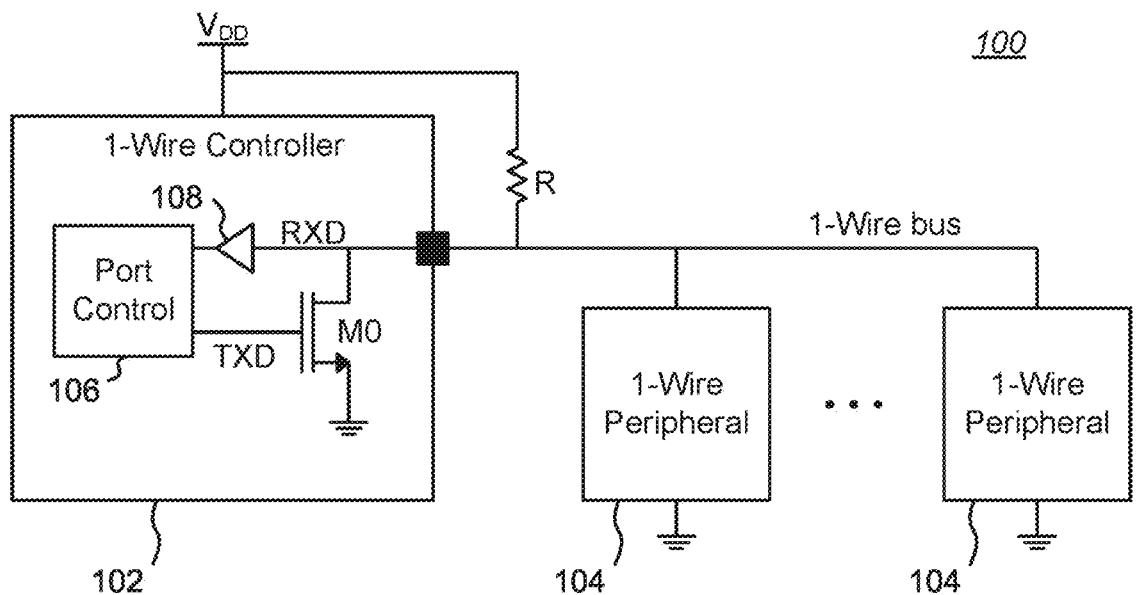
FIG. 1A is a block diagram of an example 1-Wire system.
Figure 1B:
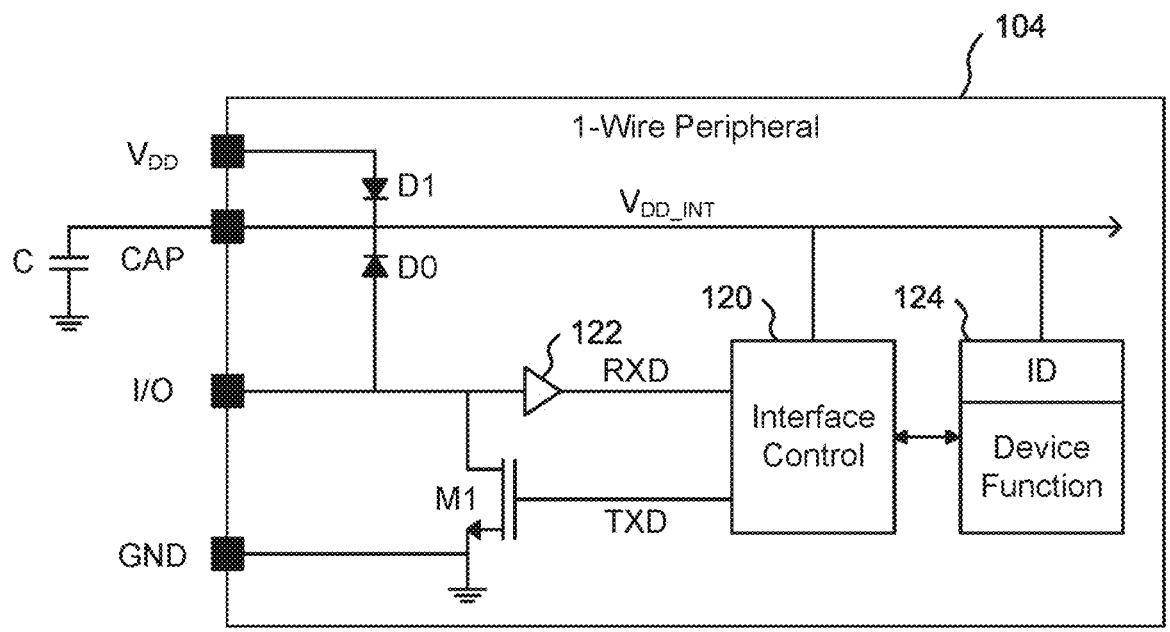
FIG. 1B is a block diagram showing a 1-Wire peripheral in greater detail.
Figure 2:
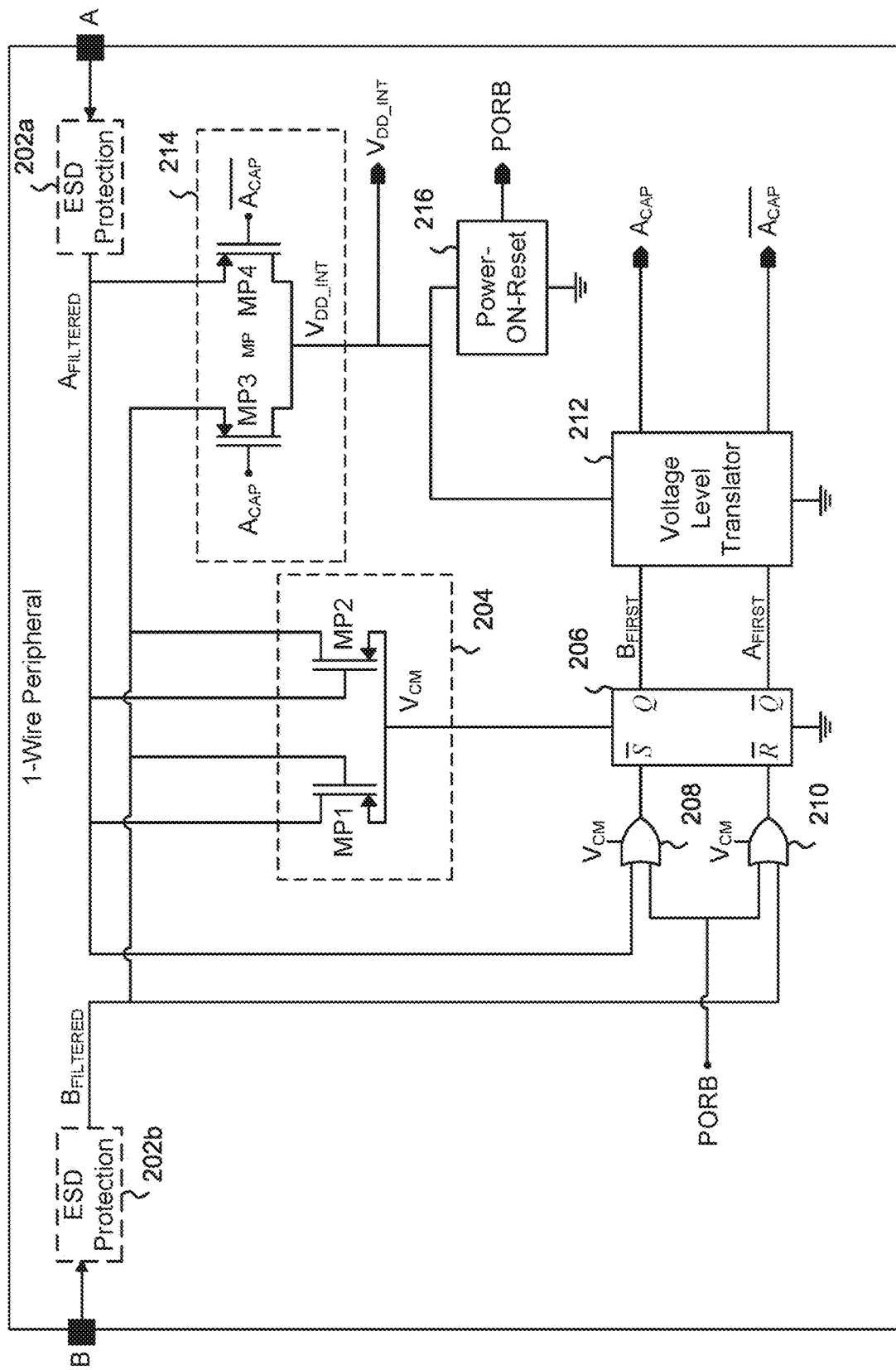
FIG. 2 is a schematic diagram of a single-conductor peripheral having swappable pins A and B, either of one of which may be used as either an I/O pin or a CAP pin.

FIG. 2 is a schematic diagram of a single-conductor peripheral 200 having swappable pins A and B, either of one of which may be coupled to an I/O line or a CAP line. For example, in a first configuration, pin A may be the I/O pin while pin B may be the CAP pin. In a second configuration, pin B may be the I/O pin while pin A may be the CAP pin. In the illustrated example, with pins A and B on opposite sides of the peripheral 200 layout, the peripheral 200 may be used as either a "left-handed" or a "right-handed" embodiment.

The illustrated circuitry of the peripheral 200 performs the following functions: detecting the initial phase of device startup; determining which of pins A and B is coupled to an I/O line like the 1-Wire bus (and thus is the I/O pin), and which of pins A and B is coupled to the storage capacitor C (and thus is the CAP pin); and generating a flag signal indicating that determination, which may be used by other circuitry within the peripheral. Detection of pin characteristics is determined at device startup by latching a logic signal to represent the fastest rising signal on the lines (I/O and CAP) coupled to pins A and B, flagging that latched signal line as being the I/O line, and preventing further changes to the latch output until the next startup cycle.

In the illustrated example, each of pins A and B is coupled to a respective optional secondary electrostatic discharge (ESD) protection circuit 202a, 202b. Many 1-Wire peripherals include a primary ESD protection circuit (not shown). However, in some applications, including the secondary ESD protection circuits 202a, 202b is shown to enhance protection for gated inputs within the peripheral 200 from ESD events. The secondary ESD protection circuits 202a, 202b may be any suitable ESD circuit, including a transient voltage suppression diode or a Zener diode. Note that while the secondary ESD protection circuits 202a, 202b are shown in a series configuration interposed between a respective pin A, B and the remaining circuitry in the peripheral 200, in many cases the secondary ESD protection circuits 202a, 202b may be coupled in a shunt configuration to the signal lines emanating from the A and B pin into the peripheral 200.

If secondary ESD protection circuits 202a, 202b are included in the peripheral 200, their respective output comprises filtered versions $A_{FILTERED}$, $B_{FILTERED}$ (also referred to as $A_{FILT}$, $B_{FILT}$) of the signals applied to the corresponding A and B pins. For purposes of this disclosure, it is assumed that the secondary ESD protection circuits 202a, 202b are present and have a shunt configuration, and accordingly reference will be made to the filtered versions $A_{FILTERED}$, $B_{FILTERED}$ of the signals applied to the corresponding A and B pins. If the secondary ESD protection circuits 202a, 202b are not used in a particular embodiment, then references to $A_{FILTERED}$ and $B_{FILTERED}$ should be taken as being the respective signals applied to the corresponding A and B pins.

A MAX A/B circuit 204 provides an output voltage $V_{CM}$ that is the greater of $A_{FILTERED}$ or $B_{FILTERED}$, thus effectively filtering out excursions in voltage on either line (e.g., from signaling on the I/O line) and providing a continuous power supply to an active-LOW Set-Reset (S'R') latch 206 and associated OR gates 208 and 210. The MAX A/B circuit 204 in the illustrated example includes a first P-type MOSFET (PFET) MP1 having a conduction channel (between drain and source) coupled to the $A_{FILTERED}$ line and a gate coupled to the $B_{FILTERED}$ line, as well as a second PFET MP2 having a conduction channel coupled to the $B_{FILTERED}$ line and a gate coupled to the $A_{FILTERED}$ line. The sources of MP1 and MP2 are coupled together and provide $V_{CM}$ to power the S'R' latch 206 when $B_{FILTERED}<A_{FILTERED}$ ($V_{CM}$ is based on power through MP1 from the $A_{FILTERED}$ line) or when $B_{FILTERED}>A_{FILTERED}$ ($V_{CM}$ is based on power through MP2 from the $B_{FILTERED}$ line). The result is that the S'R' latch 206 can be quickly powered at startup of the peripheral 200 by the I/O and CAP signal lines coupled to respective ones of the A and B pins.

In the illustrated example, the S'R' latch 206 is configured to receive $A_{FILTERED}$ at an $\overline{S}$ input through a SET OR gate 210, and to receive $B_{FILTERED}$ at an $\overline{R}$ input through a RESET OR gate 210. The S'R' latch 206 is designed to start in a balanced state at startup (i.e., both Q and $\overline{Q}$ are low before startup) and flips one way or the other based on the inputs from the $A_{FILTERED}$ and $B_{FILTERED}$ lines. Of course, the inputs to S'R' latch 206 may be reversed if logic adjustments are made as to the meaning of the Q and $\overline{Q}$ outputs.

Figure 3:
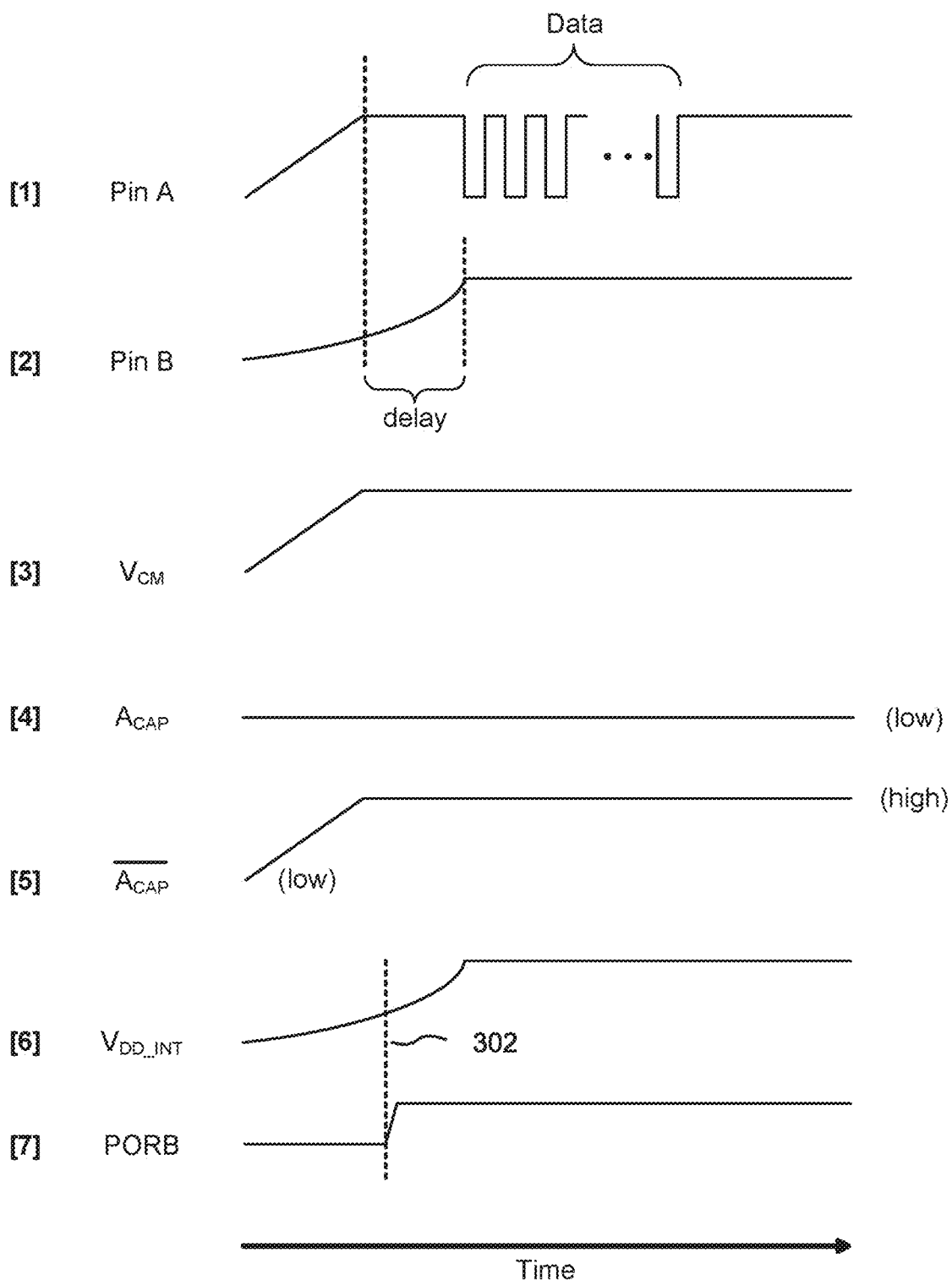
FIG. 3 is a set of voltage signals [1]-[7] as a function of time for various nodes within the example circuit shown in FIG. 2.

FIG. 3 is a set of voltage signals [1]-[7] as a function of time for various nodes within the example circuit shown in FIG. 2 (note that the amplitude of any voltage signal may be on a different scale than other voltage signals). During startup of the peripheral 200, it is assumed that the voltage on the CAP line (coupled to one of pins A and B) will be significantly lower during initial startup than the voltage on the I/O line (coupled to the other one of pins A and B), owing to the time it takes for the relatively large storage capacitor C to charge fully (keeping in mind that the storage capacitor C generally would have no charge at startup). Assuming that pin A is coupled to the I/O line and pin B is coupled to the CAP line, then voltage signals [1] and [2] show the relative rise in voltage as a function of time for an I/O signal (voltage signal [1]) versus the voltage on the CAP line (voltage signal [2]). Concurrently, $V_{CM}$ will "follow" the greater of the voltage signals applied to either pin A or pin B (see voltage signal [3] in FIG. 3), and thus will rise when the I/O line rises (on pin A in this example). Note that if pin A is coupled to the CAP line and pin B is coupled to the I/O line, then voltage signals [1] and [2] will be swapped but voltage signal [3] will remain the same.

As should be clear from FIG. 3, the I/O line signal on pin A will reach a HIGH level before the delayed CAP line signal on pin B. That delay difference means that the $B_{FILTERED}$ signal (corresponding to the CAP line in this example) at the $\overline{R}$ input will still be LOW when the $A_{FILTERED}$ signal (corresponding to the I/O line in this example) at the $\overline{S}$ input reaches a HIGH level. Accordingly, the Q output (the $B_{FIRST}$ signal) of the S'R' latch 206 will be LOW and the $\overline{Q}$ output (the $A_{FIRST}$ signal) will be HIGH (meaning pin A is coupled to the I/O line and pin B is coupled to the CAP line). The belated rise of the $B_{FILTERED}$ signal from LOW to HIGH will not change the output of the S'R' latch 206. As discussed below, a Power-ON Reset signal PORB is eventually applied to the SET OR gate 210 and the RESET OR gate 210 to prevent any data signal transitions on the I/O line from altering the output state of the S'R' latch 206.

In many applications, it is advisable to utilize a logic level translator 212 to translate the voltage levels output by the S'R' latch 206 to levels compatible with the internal voltage supply $V_{DD\_INT}$ from a supply switch circuit (see details below), and more specifically from the range of 0V-$V_{CM}$ to the range 0V-$V_{DD\_INT}$. In the illustrated example, the logic level translator 212 voltage translates the output signals from the S'R' latch 206. If $A_{FIRST}$=HIGH and $B_{FIRST}$=LOW, then the logic level translator 212 will output $A_{CAP}$=LOW and $\overline{A_{CAP}}$=HIGH (meaning that the CAP line is not coupled to pin A, but rather is coupled to pin B); see voltage signals [4] and [5] in FIG. 3. Conversely, assuming that pin A is coupled to the CAP line and pin B is coupled to the I/O line, then the logic level translator 212 will output $A_{CAP}$=HIGH and $\overline{A_{CAP}}$=LOW (meaning that the CAP line is coupled to pin A).

The $A_{CAP}$ and $\overline{A_{CAP}}$ signals are coupled to a supply switch circuit 214, and more specifically to respective gates of PFETs MP3 and MP4. The conduction channel of MP3 is coupled to pin B and the conduction channel of MP4 is coupled to pin A (note that MP3 and MP4 are typically tied directly to pins A and B, not $A_{FILTER}$ and $B_{FILTER}$; if the secondary ESD protection circuits 202a, 202b are shunt circuits—assumed to be the case in the illustrated example—then A=$A_{FILTER}$ and B=$B_{FILTER}$). The drains of MP3 and MP4 are coupled and comprise an internal voltage supply $V_{DD\_INT}$ output.

At startup, the $A_{CAP}$ and $\overline{A_{CAP}}$ signals will be at 0V, so both PFETs MP3 and MP4 will be ON (conducting) since the respective gates of MP3 and MP4 will be negative relative to their respective sources. With both MP3 and MP4 ON, the I/O line (regardless of whether coupled to pin A or B) and the CAP line (again, regardless of whether coupled to pin A or B) will be coupled together. The result is that the coupled lines will provide an internal voltage supply $V_{DD\_INT}$, and voltage on the I/O line will begin to charge the storage capacitor C through the CAP line. Of note, one of the PFETs MP3 and MP4 will transition to an OFF (blocking) state when the corresponding signal applied to the respective gate switches to HIGH. Thus, if $A_{CAP}$=HIGH, then MP3 will turn OFF, and conversely, if $\overline{A_{CAP}}$=HIGH, then MP4 will turn OFF.

As voltage signal [6] in FIG. 3 indicates, the internal voltage supply $V_{DD\_INT}$ takes some time to rise to its highest level, owing to the time it takes for the relatively large storage capacitor C to charge fully and due to the capacitance of other circuits (not all shown) coupled to the internal voltage supply $V_{DD\_INT}$.

TABLE 1 below summarizes the input and output states of the S'R' latch 206:

TABLE 1

| S' | R' | Q | $\overline{Q}$ |
|----|----|----|----|
| 0 | 0 | undefined | undefined |
| 0 | 1 | 1 | 0 |
| 1 | 0 | 0 | 1 |
| 1 | 1 | no change to prior state of output | |

TABLE 2 below summarizes the function of the illustrated peripheral 200:

TABLE 2

| S'R' Latch Inputs | Pin A | Pin B | $A_{CAP}$ | $\overline{A_{CAP}}$ |
|---|---|---|---|---|
| If Pin A rises faster than Pin B | I/O line | CAP line | LOW | HIGH |
| If Pin B rises faster than Pin A | CAP line | I/O line | HIGH | LOW |

If a logic level translator 212 is not needed, then the $A_{FIRST}$ and $B_{FIRST}$ signals may be applied to the gates of the PFETs MP3 and MP4 in place of the $\overline{A_{CAP}}$ and $A_{CAP}$ signals, respectively (possibly with a buffer or inverter in between if needed to drive MP3 and MP4).

The internal voltage supply $V_{DD\_INT}$ is coupled to a conventional Power-ON-Reset (POR) circuit 216. The POR circuit 216 provides a predictable, regulated voltage after the initial application of power to the peripheral 200. Once the internal voltage supply $V_{DD\_INT}$ rises above a selected threshold or "Power Good" level (see dotted line 302 superimposed on voltage signal [6] in FIG. 3), an output logic signal PORB of the POR circuit 216 will rise from 0V (in startup condition) to a HIGH state ($\approx V_{DD\_INT}$); see voltage signal [7] in FIG. 3. At this point, application of the HIGH state of PORB to the SET OR gate 210 and the RESET OR gate 210 prevents any post-startup data signal transitions on the I/O line from altering the output state of the S'R' latch 206 (see signal line [1] in FIG. 3 for an example of data signal transitions on the I/O line).

As should be clear, either of $A_{CAP}$ or $\overline{A_{CAP}}$ comprise flag signals that may be used to indicate which of pin A or B is coupled to the I/O line or the CAP line, and thus may be used by other circuitry within the peripheral 200 to control behavior. For example, assertion of $A_{CAP}$=LOW may cause other circuitry to treat pin A as being coupled to the I/O line (e.g., the 1-Wire bus), and conversely, assertion of $A_{CAP}$=HIGH may cause such other circuitry to treat pin B as being coupled to the I/O line. A multiplexer or the like can be used to selectively connect such other circuitry (e.g., an input buffer 122 or an open-drain output transistor Mx for transmissions) to pin A or pin B using either of the $A_{CAP}$ or $\overline{A_{CAP}}$ signals as a selector bit. As another example, the state of either of the $A_{CAP}$ or $\overline{A_{CAP}}$ signals may be used to define an ID for the peripheral 200—for example, if $A_{CAP}$ is LOW, then the ID may have first value, while if $A_{CAP}$ is HIGH, then the ID may have second value. In any case, the supply switch 214 will provide the internal voltage supply $V_{DD\_INT}$ to other circuitry regardless of whether the CAP line is coupled to pin A or pin B.

Embodiment Details

Figure 4:
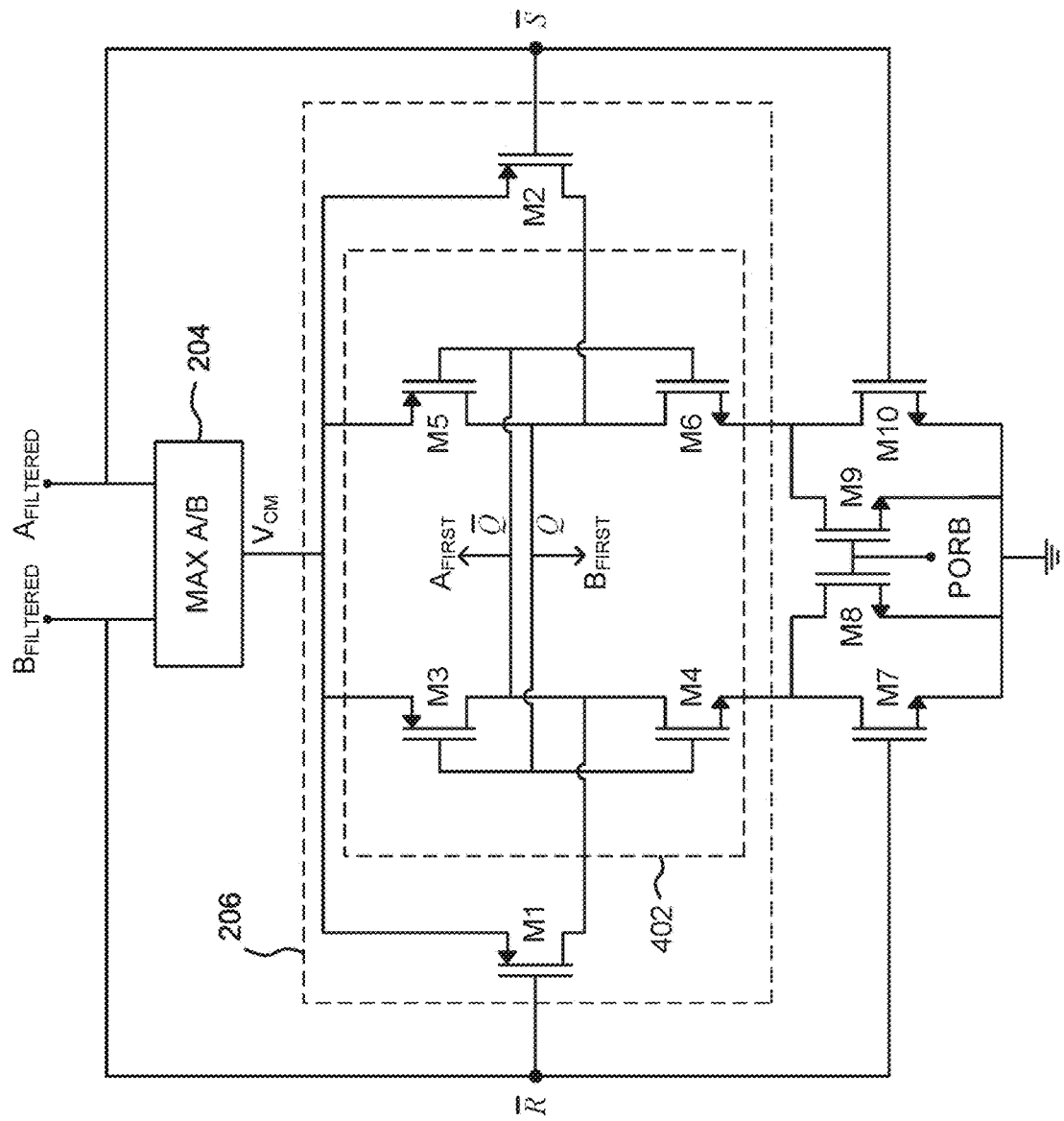
FIG. 4 is a schematic diagram of one embodiment of an S'R' latch and associated SET OR gate and RESET OR gate that may be used in the peripheral of FIG. 2.

FIG. 4 is a schematic diagram of one embodiment of an S'R' latch 206 and associated SET OR gate and RESET OR gate that may be used in the peripheral 200 of FIG. 2. Power to the S'R' latch 206 is provided by the MAX A/B circuit 204 as described above. The SET OR gate 208 of FIG. 2 comprises PFET M2 and NFETs M9 and M10, while the RESET OR gate 210 of FIG. 2 comprises PFET M1 and NFETs M7 and M8. A set of four FETs (PFET M3, NFET M4, PFET M5, and NFET M6) comprise a conventional latch core 402 for the active-LOW S'R' latch.

In the example embodiment of FIG. 4, PFETs M1 and M2 can be made relatively weak (i.e., having a relatively high ON resistance $R_{ON}$) devices which cannot flip the latch on their own (i.e., M7 and M8 or M9 and M10 would both have to be OFF). More conventionally, a second PFET could be added above or below both M1 and M2 and connected to PORB. However, the use of "weak" devices for PFETs M1 and M2 saves at least two relatively large transistor devices.

During startup, PFET M2 and NFET M10 are controlled by the $A_{FILTERED}$ signal and force the latch core 402 to the Set state if $B_{FILTERED} > A_{FILTERED}$—thus, the Q output (the $B_{FIRST}$ signal) of the latch core 402 will be HIGH and the $\overline{Q}$ output (the $A_{FIRST}$ signal) will be LOW (meaning pin B is coupled to the I/O line and pin A is coupled to the CAP line). Similarly, during startup, PFET M1 and NFET M7 are controlled by the $B_{FILTERED}$ signal and force the latch core 402 to the Reset state if $A_{FILTERED} > B_{FILTERED}$—thus, the Q output (the $B_{FIRST}$ signal) of the latch core 402 will be LOW and the $\overline{Q}$ output (the $A_{FIRST}$ signal) will be HIGH (meaning pin A is coupled to the I/O line and pin B is coupled to the CAP line).

Once communications on the I/O line starts, resulting in the (now determined) I/O pin dropping at times to 0V, the S'R' latch 206 remains operational because $V_{CM}$ will still be supplied by the MAX A/B circuit 204 (because the CAP line is HIGH), and only PFETs M1 and M2 can affect the state of the latch core 402. If M1 and M2 are chosen as relatively weak devices with respect to other devices within the circuit, the S'R' latch 206 cannot change state until the next startup cycle. Alternately, additional transistor devices can be placed above or below M1 and M2 with gates tied to PORB.

As should be clear to one of ordinary skill in the art, the functions of the latch core 402 and the controlling SET 208 and RESET 210 gates may be implemented with other specific devices and/or circuit configurations without departing from the teachings of this disclosure.

Figure 5:
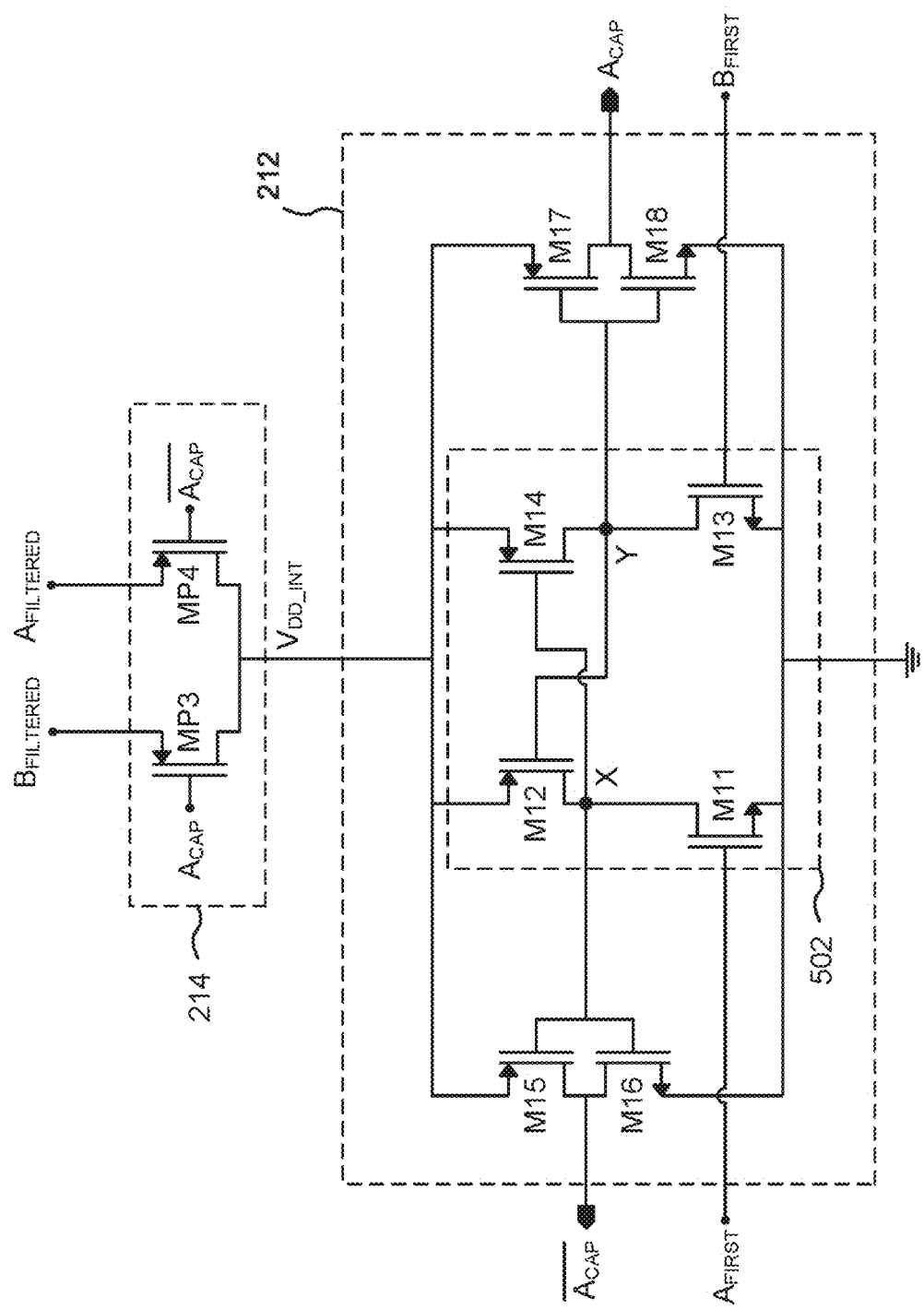
FIG. 5 is a schematic diagram of one embodiment of a logic level translator that may be used in the peripheral of FIG. 2.

FIG. 5 is a schematic diagram of one embodiment of a logic level translator 212 that may be used in the peripheral 200 of FIG. 2. The supply switch circuit 214 described above provides $V_{DD\_INT}$ to the logic level translator 212. A set of four FETs (NFET M11, PFET M12, NFET M13, and PFET M14) comprise a level translation core 502 that translates the voltage of inputs $A_{FIRST}$ and $B_{FIRST}$ from the range of $0V$-$V_{CM}$ to the range $0V$-$V_{DD\_INT}$ in known fashion, resulting in inverted voltage translated outputs at nodes X and Y, respectively. PFET/NFET pairs M15, M16 and M17, M18 each comprise inverters that invert the signals at nodes X and Y, resulting in the $A_{CAP}$ and $\overline{A_{CAP}}$ signals described above.

As should be clear to one of ordinary skill in the art, the functions of the level translation core 502 and inverters within the logic level translator 212 may be implemented with other specific devices and/or circuit configurations without departing from the teachings of this disclosure.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for case of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 6:
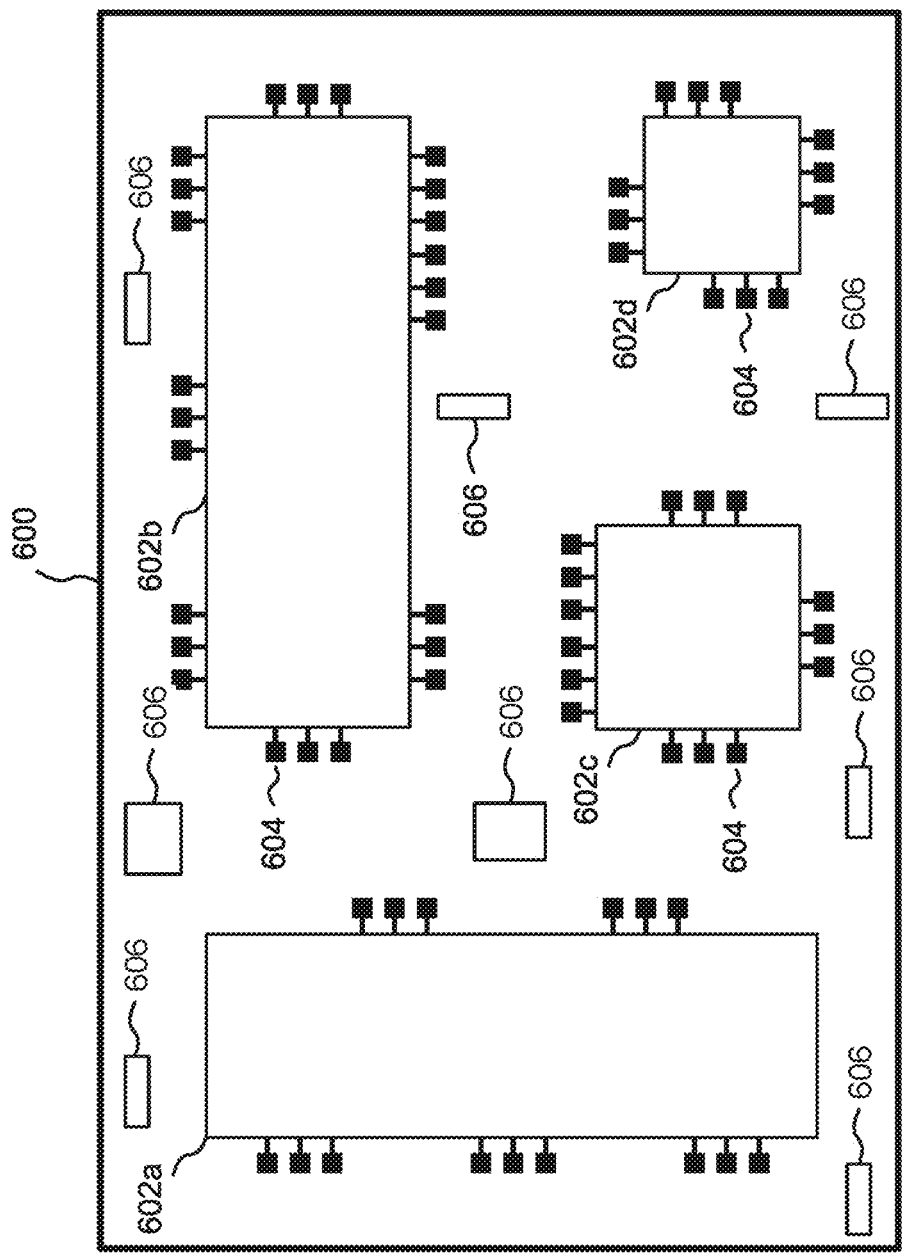
FIG. 6 is a top plan view of a substrate that may be, for example, a printed circuit board or chip module substrate (e.g., a thin-film tile).

As one example of further integration of embodiments of the present invention with other components, FIG. 6 is a top plan view of a substrate 600 that may be, for example, a printed circuit board or chip module substrate (e.g., a thin-film tile). In the illustrated example, the substrate 600 includes multiple ICs 602a-602d having terminal pads 604 which would be interconnected by conductive vias and/or traces on and/or within the substrate 600 or on the opposite (back) surface of the substrate 600 (to avoid clutter, the surface conductive traces are not shown and not all terminal pads are labelled). The ICs 602a-602d may embody, for example, temperature sensors, humidity sensors, and other circuitry. For example, IC 602d may incorporate an instance of a single-conductor peripheral 200 like the circuit shown in FIG. 2.

The substrate 600 may also include one or more passive devices 606 embedded in, formed on, and/or affixed to the substrate 600. While shown as generic rectangles, the passive devices 606 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 600 to other passive devices 606 and/or the individual ICs 602a-602d. The front or back surface of the substrate 600 may be used as a location for the formation of other structures.

Methods

Figure 7:
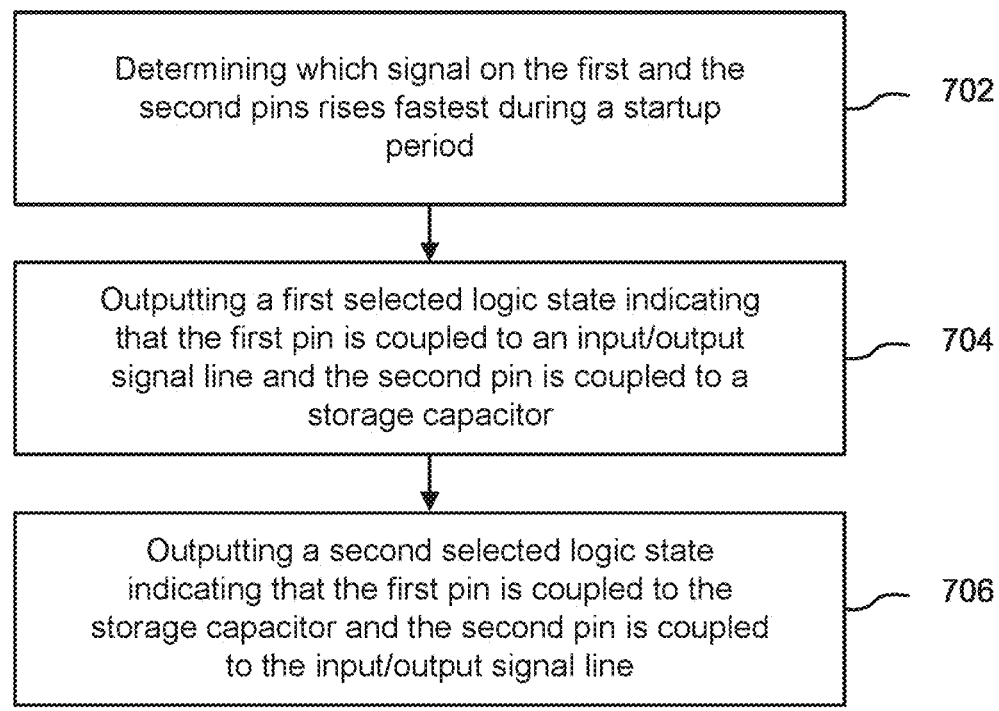
FIG. 7 is a process flow chart showing one method for determining the characteristics of respective signals on a first pin and a second pin of a peripheral configured to be coupled to a single-conductor communications bus.

Another aspect of the invention includes methods for pin determination for 1-Wire and similar single-conductor interfaces. For example, FIG. 7 is a process flow chart 700 showing one method for determining the characteristics of respective signals on a first pin and a second pin of a peripheral configured to be coupled to a single-conductor communications bus. The method includes: determining which signal on the first and the second pins rises fastest during a startup period (Block 702); outputting a first selected logic state indicating that the first pin is coupled to an input/output signal line and the second pin is coupled to a storage capacitor (Block 704); and outputting a second selected logic state indicating that the first pin is coupled to the storage capacitor and the second pin is coupled to the input/output signal line (Block 706).

Additional aspects of the above method may include one or more of the following: generating a power good indication when a voltage on an internal voltage supply output rises above a selected threshold; applying the power good indication so as to prevent alteration of the first and second selected logic states; and/or coupling a first electrostatic discharge circuit to the first pin, and a second electrostatic discharge circuit to the second pin.

Alternative Embodiments

Figure 8:
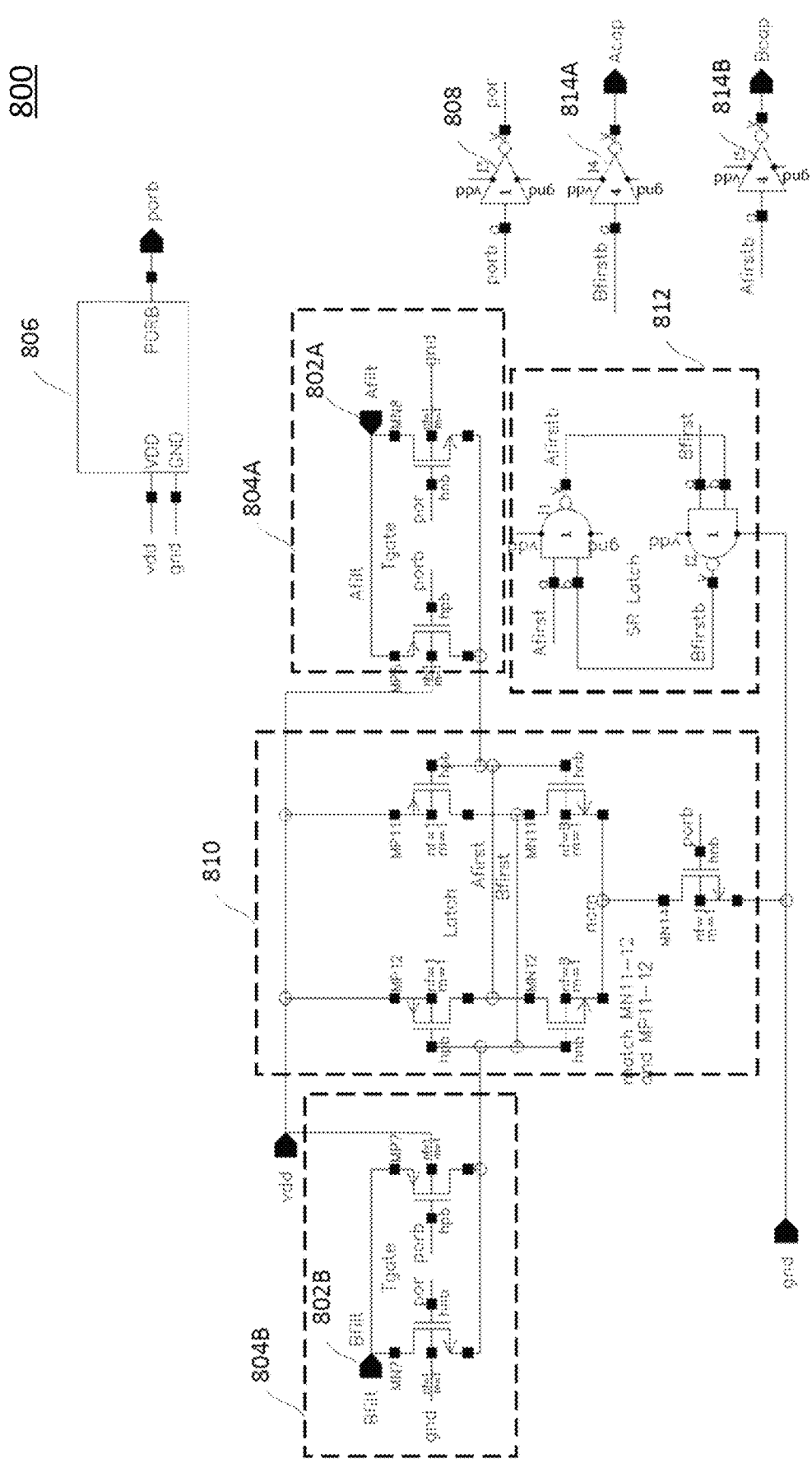
FIG. 8 is a schematic diagram of circuit for defining swappable pins at start-up or reset, according to some embodiments.

FIG. 8 is a schematic diagram of a circuit for defining swappable pins at start-up or reset, according to some embodiments. In particular, the circuit in FIG. 8 may define the functionality of swappable pins A and B when a chip is reset or for a power supply interrupt, loss, or restart (or lost). As discussed above, pins A and B can perform swappable functions, such as providing power or I/O to a chip or providing charge from a capacitor. The pin providing power or I/O may be referred to as a I/O pin, and the pin providing charge from a capacitor may be referred to as a CAP pin. The CAP pin may be used to store charge from the I/O pin when the I/O pin is not transmitting signals. In one configuration, pin A may be defined as a I/O pin while pin B may be defined as a CAP pin. In another configuration, pin B may be defined as a I/O pin, while pin A may be defined as a CAP pin. As will be discussed below, a pin with a higher voltage at a time a power source crosses a power-on-reset threshold may be defined as a I/O pin, while a pin with a lower voltage at that time may be defined as a CAP pin. Each one of pins A and B when used as the I/O pin may be associated with an address that may be a hardwired or a programmable address.

The circuit illustrated in FIG. 8 defines functionality of pins A and B at start-up based on a voltage corresponding to the signals at pins A and B. The circuit includes transmission gate circuits 804A and 804B. Transmission gate circuit 804A receives its input signal $A_{FILT}$ 802A from pin A and transmission gate circuit 804B receives its input signal $B_{FILT}$ 802B from pin B. As discussed in FIG. 2, pins A and B may be coupled to the respective EST protection circuits to generate $A_{FILT}$ 802A and $B_{FILT}$ 802B signals from the signals corresponding to the respective pins A and B. For simplicity, the EST protection circuits are not shown. Transmission gate circuit 804A includes gates MN8 and MP6. Transmission gate circuit 804B includes gates MN7 and MP7. Gates MN8, MP6, MN7, and MP7 may be N-MOS and P-POS devices. Gates MP7 and MP6 are connected to a voltage supply VDD, while gates MN7 and MN8 are connected to ground GND when the transmission gates are OFF. Similarly, gates MP7 and MP6 are connected to a ground GND, while gates MN7 and MN8 are connected to voltage supply VDD when the transmission gates are ON.

The output of the transmission gate circuit 804A is a signal $A_{FIRST}$ and the output of transmission gate circuit 804B is a signal $B_{FIRST}$.

The circuit in FIG. 8 also includes a power-on-reset (POR) circuit 806. POR circuit 806 is connected to VDD and GND and outputs a PORB signal. POR circuit 806 determines whether the voltage supply VDD is below a POR threshold. The POR threshold may be a configurable or hardwired threshold in POR circuit 806. Once the voltage or power supply VDD is higher than the POR threshold, the PORB node may rise from 0V to VDD.

POR circuit 806 is also coupled to a circuit 808. Circuit 808 receives the PORB signal from POR circuit 806 and generates an inverse of the PORB signal, called a POR signal, as output.

POR circuit 806 and circuit 808 are coupled to transmission gate circuits 804A and 804B. For example, gate MP6 of transmission gate circuit 804A and gate MP7 of transmission gate circuit 804B receive the PORB signal, while gate MN7 of transmission gate circuit 804B and gate MN8 of transmission gate circuit 804A receive POR signal. The POR and PORB signals determine when the transmission gate circuits 804A and 804B turn on and off, such as when the voltage supply is above the POR threshold.

The circuit in FIG. 8 includes a latch circuit 810. Latch circuit 810 includes gates MP11, MN11, MP12, and MN12. Gates MP11 and MN11, and gates MP12 and MN12 may operate as inverters. Additionally, latch circuit 810 includes gate MN14. Latch circuit 810 is coupled to transmission gate circuits 804A and 804B and receives signals $A_{FILT}$ 802A and $B_{FILT}$ 802B. POR circuit 806 is coupled to gate MN14 which receives the PORB signal. Gate MN14 activates the latch circuit using the PORB signal once the voltage source is above the POR threshold. The outputs of latch circuit 810 are signals $A_{FIRST}$ and $B_{FIRST}$, which indicate whether a voltage at pin A or pin B was higher at the time power supply VDD was above the POR threshold. Due to the inverters, signals $A_{FIRST}$ and $B_{FIRST}$ may be inverses of each other, thus if signal $A_{FIRST}$ is high, then signal $B_{FIRST}$ is low, and vice versa.

In the acquisition mode, e.g., at the initial phase, latch circuit 810 may receive $A_{FILT}$ 802A and $B_{FILT}$ 802B signals from the respective transmission gate circuits 804A and 804B. While the power source VDD is below the POR threshold, gates MP11, MN11, MP12, and MN12 monitor signals $A_{FILT}$ 802A and $B_{FILT}$ 802B while gate MN14 is off. Once the power source VDD is above the POR threshold, the PORB node may rise from a 0V state to a VDD state, causing transmission gate circuits 804A and 804B to turn off, gate MN14 to turn on, and activating latch circuit 810. Once latch circuit 810 is activated, gates MP11 and MN11, and gates MP12 and MN12 act as inverters and determine which of inverters MP11-MN11 or MP12-MN12 will go high or low, thus generating signals $A_{FIRST}$ and $B_{FIRST}$. As discussed above, signals $A_{FIRST}$ and $B_{FIRST}$ may be inverses of each other. The signals $A_{FIRST}$ and $B_{FIRST}$ indicate whether the voltage corresponding to signal $A_{FILT}$ 802A from pin A or $B_{FILT}$ 802B from pin B was higher at the time VDD crossed the POR threshold. The pin corresponding to the signal with the higher voltage is defined to be the I/O pin, and the pin corresponding to the signal with the lower voltage is defined to be the CAP pin. Thus, if $A_{FIRST}$ is greater than $B_{FIRST}$, then pin A is defined as a I/O pin and pin B is defined as a CAP pin. Alternatively, if $B_{FIRST}$ is greater than $A_{FIRST}$, then pin B is defined as a I/O pin and pin A is defined as a CAP pin.

The circuit shown in FIG. 8, also includes an SR latch circuit 812. SR latch circuit 812 receives signals $A_{FIRST}$ and $B_{FIRST}$ and generate signals $A_{FIRST}$B and $B_{FIRST}$B. SR latch circuit 812 may be an optional circuit that may ensure signals $A_{FIRST}$ and $B_{FIRST}$ are complementary logic levels, e.g., one is high and one is low. For example, signals $A_{FIRST}$ and $B_{FIRST}$ that were generated before latch circuit 810 was turned on, may be based on the voltage levels that are not standard logic levels (high or low). SR latch circuit 812 may include two NAND gates, where each NAND gate receives a respective $A_{FIRST}$ or $B_{FIRST}$ signal and the output of the other NAND gate. For example, one NAND gate may receive signals $A_{FIRST}$ and $B_{FIRST}$B, where signal $B_{FIRST}$B is an output of the second NAND gate. Similarly, the second NAND gate may receive signals $B_{FIRST}$ and $A_{FIRST}$B where, where signal $A_{FIRST}$B is an output of the first NAND gate. Notably, another logic circuit instead of the SR latch circuit 812 that ensures the outputs are complementary logic levels, e.g., $A_{FIRST}$ and $B_{FIRST}$ signals of latch circuit 810, are valid where one is high and one is low may also be used.

The circuit shown in FIG. 8 may include inverter circuits 814A and 814B. Inverter circuits 814A and 814B may receive the respective outputs of the SR latch circuit 812. For example, inverter circuit 814A may receive signal $B_{FIRST}$B and generate signal $A_{CAP}$ while inverter circuit 814B may receive signal $A_{FIRST}$B and generate signal $B_{CAP}$. Signals $A_{CAP}$ and $B_{CAP}$ indicate whether pin A or pin B are assigned to be a CAP pin. For example, if signal $A_{CAP}$ is high, and signal $B_{CAP}$ is low, then pin A is defined as a CAP pin, while if signal $B_{CAP}$ is high, and signal $A_{CAP}$ is low, then pin B is defined as a CAP pin. The other pin is then defined as a I/O pin. Notably, signals $A_{CAP}$ and $B_{CAP}$ are valid once power source VDD reaches or is above a POR threshold as determined by the POR circuit 806.

Once the I/O pin and the CAP pin is defined, the embodiments are also directed to connecting the internal supply dependent circuitry to the CAP pin and muxing the input data from the I/O pin to a Schmitt trigger. The embodiments are also directed to defining a chip ID based on the determined pins.

Once pins A and B of a chip are defined as a I/O pin and a CAP pin, the definitions may continue until the power source VDD drops again to below the POR threshold, which may occur when a chip is powered-down or reset. Frequent chip power-downs may occur during testing, and the circuitry discussed above causes the functionality of pins A and B to be redefined at each start-up. The chip may be included in a computing device, such as a portable computing device, e.g., a smartphone, a watch, a ring, or eyeglasses.

Figure 9:
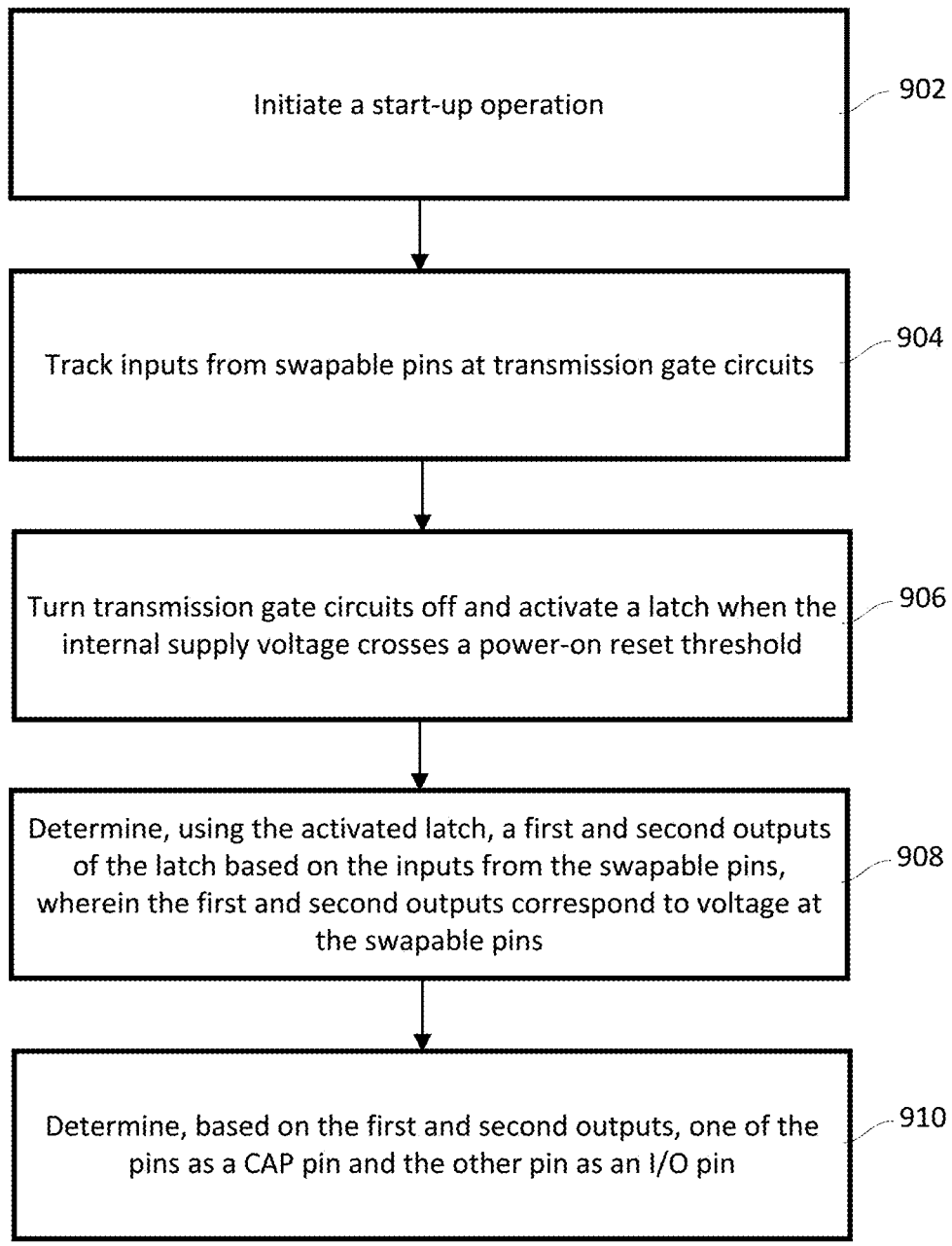
FIG. 9 is a flow chart of a method for defining swappable pins at start-up or reset, according to some embodiments.

FIG. 9 is a flow chart of a method 900 for defining functionality of the swappable pins at start-up or reset, according to some embodiments. The embodiments of method 900 may be performed using the circuit discussed in FIGS. 2 and 8.

At operation 902, a start-up operation is initiated. As discussed above, during start-up, a power source VDD is below a POR threshold and rises to above the POR threshold.

At operation 904, the inputs from pins A and B are tracked. For example, gates MP7, MN7, MP6, and MN8 in transmission gate circuits 804A and 804B track the input from swappable pins A and B. The inputs from pins A and B may be signals $A_{FILT}$ and $B_{FILT}$ that were filtered using a respective ESD protection circuits 202a, 202b, discussed in FIG. 2, and are passed to latch circuit 810 as $A_{FIRST}$ and $B_{FIRST}$.

At operation 906, the transmission gates circuits are turned off and a latch circuit is active. For example, once POR circuit 806 connected to transmission gate circuits 804A and 804B, and gate MN14 of latch circuit 810 determines that the power source VDD crossed the POR threshold, transmission gate circuits 804A and 804B are turned off and latch circuit 810 is activated using gate MN14.

At operation 908, the $A_{FIRST}$ and $B_{FIRST}$ signals are determined. For example, using the activated latch circuit 810, gates MP11 and MN11, and gates MP12 and MN12 acting as inverters determine whether signal $A_{FIRST}$ is higher than signal $B_{FIRST}$ or vice versa at the time the power source VDD crossed the POR threshold.

At operation 910, the functionality of the pins A and B is defined. For example, inverter circuits 814A and 814B define functionality to pins A and B based on the value of signals $A_{FIRST}$ and $B_{FIRST}$. For example, if signal $A_{FIRST}$ is high and signal $B_{FIRST}$ is low, then pin B is defined as a CAP pin and pin A is defined as a I/O pin. On the other hand, if signal $B_{FIRST}$ is high and signal $A_{FIRST}$ is low, then pin A is defined as a CAP pin and pin B is defined as a I/O pin. In some instances, SR latch circuit 812 may receive signals $A_{FIRST}$ and $B_{FIRST}$ and ensure that signals $A_{FIRST}$ and $B_{FIRST}$ are at complementary voltage levels (e.g., one signal is high, and the other signal is low) before generating signals $A_{FIRST}$ B and $B_{FIRST}$ B. In this case, the inverter circuits 814A and 814B defines functionality of pins A and B based on signals $A_{FIRST}$ B and $B_{FIRST}$ B as discussed above.

Fabrication Technologies & Options

While the examples above have mostly focused on the 1-Wire system, the invention may be used with other communications bus architectures and protocols that provides data, signaling, and power over a single conductor. As should be clear to one of ordinary skill in the art, if desired, the logic levels used to control the various elements of the peripheral 200 shown in FIG. 2 may be inverted if complementary changes are made throughout; for example, the S'R' latch 206 may be implemented as an active-HIGH circuit if suitable changes are made to the input signals and output signals (e.g., by use of inverters as needed).

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

With respect to the figures referenced in this disclosure, the dimensions for the various elements are not to scale; some dimensions may be greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies.

When using these technologies, the term "gate" used in the disclosure above should be taken to refer to a control input, such as a gate, base, or similarly functioning element. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A circuit, comprising:
 a first transmission gate circuit configured to monitor a signal from a first pin;
 a second transmission gate circuit configured to monitor a signal from a second pin, wherein the first pin and the second pin are defined to perform a first function or a second function;
 a power-on-reset (POR) circuit configured to monitor a supply voltage;
 a latch circuit configured to:
  receive outputs of the first transmission gate circuit and the second transmission gate circuit as inputs; and
  generate a first output corresponding to the first pin and a second output corresponding to the second pin once the POR circuit detects that the supply voltage is above a POR threshold, wherein the first output is an inverse of the second output, and wherein the first function of the first pin is defined based on the first output and the second function of the second pin is defined based on the second output.

2. The circuit of claim 1, wherein the first output is greater than the second output and the first pin is defined as a I/O pin and the second pin is defined as a capacitance pin.

3. The circuit of claim 2, wherein the I/O pin is configured to provide power and an input/output interface to a chip.

4. The circuit of claim 2, wherein the capacitance pin is coupled to a capacitor and is configured to charge the I/O pin.

5. The circuit of claim 1, further comprising:
 a first inverter circuit configured to receive the first output of the latch circuit and define the first function of the first pin based on the first output; and
 a second inverter circuit configured to receive the second output of the latch circuit and define the second function of the second pin based on the second output.

6. The circuit of claim 1, wherein the POR circuit is coupled to the first transmission gate circuit and the second transmission gate circuit, and is further configured to:
 detect that the supply voltage to is above the POR threshold; and
 in response to the detecting, generate a signal to the first transmission gate circuit and the second transmission gate circuit, wherein the first transmission gate circuit and the second transmission gate circuit are configured to turn off in response to the signal.

7. The circuit of claim 6, wherein the POR circuit is coupled to the latch circuit and configured to generate the signal to the latch circuit; and
 the latch circuit comprises:
  a first gate and a second gate arranged in series and configured to receive the outputs of the first transmission gate circuit and the second transmission gate circuit;
  a third gate and a fourth gate arranged in series and in parallel with the first gate and the second gate, and configured to receive the outputs of the first transmission gate circuit and the second transmission gate circuit; and
  a fifth gate configured to turn on the latch circuit in response to the signal.

8. The circuit of claim 7, wherein the first gate and the second gate form a first inverter circuit at the latch circuit, and wherein the third gate and the fourth gate form a second inverter circuit at the latch circuit, and wherein the first inverter circuit and the second inverter circuit are configured to generate the first output that is the inverse of the second output at the latch circuit.

9. The circuit of claim 1, wherein the first pin is defined with the first function and the second pin is defined with the second function once the power supply is re-started.

10. The circuit of claim 1, further comprising:
 an SR latch circuit configured to:
  receive the first output and the second output of the latch circuit; and
  confirm that voltage levels corresponding to the first output and the second output of the latch circuit are complementary voltage levels.

11. A method comprising:
 tracking, using transmission gate circuits and a latch circuit, inputs from a first pin and a second pin, where the first pin and the second pin are swappable pins;
 turning the transmission gate circuits off and activating the latch circuit once a power supply reaches a power-on-reset (POR) threshold;
 determining, using the latch circuit and one the POR threshold is reached, a first output associated with the first pin and a second output associated with the second pin from the inputs; and
 defining, using the first output and the second output, a first functionality of the first pin, and a second functionality of the second pin.

12. The method of claim 11, further comprising:
 determining that the first output is higher than the second output; and
 based on the determining, defining the first functionality of the first pin as a I/O pin and the second functionality of the second pin as a capacitance pin.

13. The method of claim 11, further comprising:
 determining that the second output is higher than the first output; and
 based on the determining, defining the first functionality of the first pin as a capacitance pin and the second functionality of the second pin as a I/O pin.

14. The method of claim 11, further comprising:
 initiating a start-up operation, wherein the start-up operation causes the power supply to rise from below the POR threshold to above the POR threshold.

15. The method of claim 11, wherein the transmission gate circuits are coupled to a POR circuit, and further comprising:
 detecting, using the POR circuit, that the power supply reaches the POR threshold; and
 in response to the detecting, issuing, using the POR circuit a signal to the transmission gates circuits, wherein the transmission gate circuits are turned off in response to receiving the signal.

16. The method of claim 15, wherein the latch circuit is coupled to the POR circuit, and further comprising:
 issuing, using the POR circuit, the signal to the latch circuit, wherein the latch circuit is activated in response to receiving the signal.

17. The method of claim 11, further comprising:
 receiving, at a first transmission gate circuit of the transmission gate circuits an input from the first pin; and
 receiving, at a second transmit gate circuit of the transmission gate circuits, an input from the second pin.

18. The method of claim 11, further comprising:
 determining, using an SR latch circuit, that the first output and the second output are complementary outputs, wherein the complementary outputs are generated after the power supply is above the POR threshold.

19. A chip, comprising:
a first pin;
a second pin; and
a circuit configured to define functionality of the first pin and the second pin in the chip, the circuit comprising
   a power-on-reset (POR) circuit configured to detect that a supply voltage is above a POR threshold;
   transmission gate circuits configured to monitor inputs from the first pin and the second pin and deactivate once the POR circuit detects that the supply voltage is above the POR threshold;
   a latch circuit configured to:
      receive outputs of the transmission gate circuits as inputs;
      activate once the POR circuit detects that the supply voltage is above the POR threshold; and
      once activated, generate a first output corresponding to the first pin, and a second output corresponding to the second pin, wherein the first output is an inverse of the second output, and wherein the functionality of the first pin and the second pin are defined based on the first output and the second output.

20. The chip of claim 19, wherein the POR circuit is configured to detect that the supply voltage is above the POR threshold during a chip restart.

* * * * *